United States Patent [19]

Fredell

[11] Patent Number: 5,008,069
[45] Date of Patent: Apr. 16, 1991

[54] DEVICE FOR COOLING A HEAT-GENERATING MEMBER

[75] Inventor: Jan Fredell, Västerås, Sweden

[73] Assignee: ABB Atom AB, Västerås, Sweden

[21] Appl. No.: 479,418

[22] Filed: Feb. 13, 1990

[30] Foreign Application Priority Data

Feb. 13, 1989 [SE] Sweden ................. 8900480

[51] Int. Cl.⁵ .............................................. G21C 15/18
[52] U.S. Cl. ..................................... 376/299; 376/328
[58] Field of Search ............... 376/282, 283, 298, 299, 376/307, 310, 328

[56] References Cited

U.S. PATENT DOCUMENTS

| 4,519,978 | 5/1985 | Brachet et al. | 376/307 |
| 4,526,742 | 7/1985 | Hannerz | 376/282 |
| 4,608,224 | 8/1986 | Brachet | 376/298 |
| 4,643,871 | 2/1987 | Fajeau | 376/298 |

Primary Examiner—Daniel D. Wasil
Attorney, Agent, or Firm—Watson, Cole, Grindle & Watson

[57] ABSTRACT

A heat-generating member (3), in particular a nuclear reactor core, is placed in a liquid contained in a pressure vessel (1) and adapted to serve as a coolant for the heat-generating member. For cooling of the liquid the pressure vessel is adapted to be included in a circulation system (15a, 15, 14, 16, 16a) for self-circulation of the liquid and/or of steam of the liquid with any contents of uncondensable gas. The circulation system also includes an evaporator (14) arranged in an evaporation pool (13), a supply conduit (15) for conducting liquid and/or steam from a point of connection (15a) in the upper part of the pressure vessel to the evaporator, and a discharge conduit (16) for conducting liquid from the evaporator to a point of connection (16a) on the pressure vessel which is located below the point of connection (15a) for the supply conduit. The evaporator is located at a higher level than the point of connection (16a) on the pressure vessel for the discharge conduit (16). At a level above its bottom (16b) the discharge conduit is connected to a discharge vessel (21) by means of a connecting conduit (20), which only allows a considerably smaller flow than the flow in the circulation system, for discharging uncondensable gas from the circulation system, which discharge vessel (21) is provided with one or more outlets (22a, 22a) for gas and steam for maintaining a lower pressure in the discharge vessel than inside the evaporator.

10 Claims, 1 Drawing Sheet

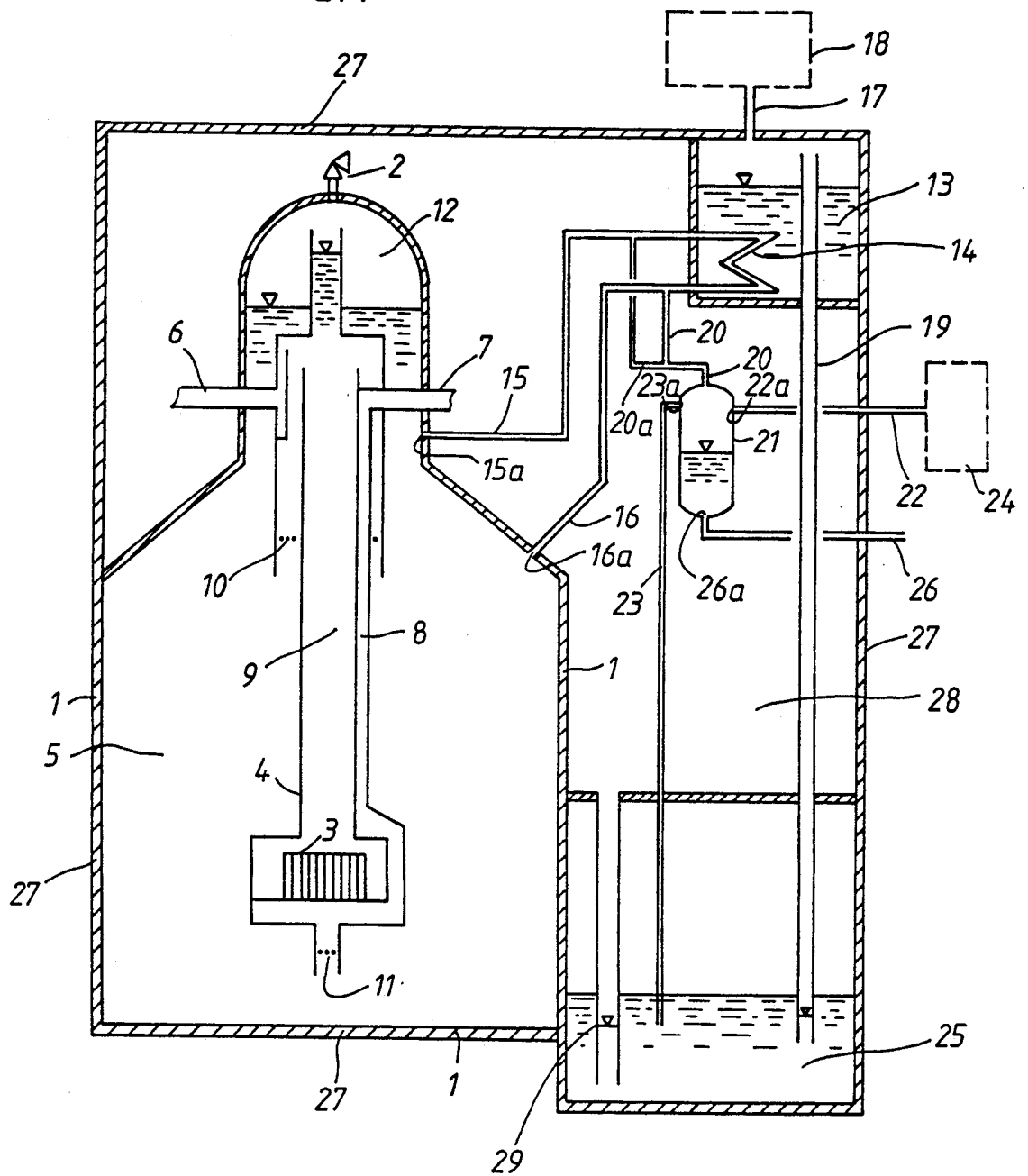
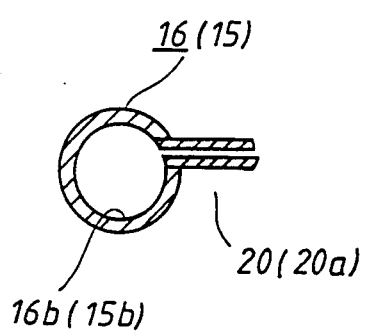

DEVICE FOR COOLING A HEAT-GENERATING MEMBER

BACKGROUND AND SUMMARY OF THE INVENTION

The present invention relates to a device for cooling of a heat-generating member which is placed in a liquid located in a pressure vessel, which liquid is adapted to serve as a coolant for the heat-generating member. The present invention is specially directed to the case where the heat-generating member consists of a core in a nuclear reactor of the type in which the reactor vessel is arranged in a neutron-absorbing liquid, for example an aqueous solution of boric acid, and the reactor coolant in the lower and upper ends of the reactor is arranged in hydraulic communication with the neutron-absorbing liquid. During normal operation the core in such a reactor is cooled by means of a coolant flow, normally a light water flow, continuously flowing through the core and the reactor vessel, the heat contents of the flow being utilized in a steam generator, or other heat exchanger, before the coolant is returned to the reactor vessel for repeated heating in the core. A reactor of such a kind is described, inter alia, in Swedish patent specifications Nos. 7606622-4 and 8102000-0.

In case of an operational disturbance, an established pressure equilibrium between the neutron-absorbing liquid and the reactor coolant is disrupted, resulting in the neutron-absorbing liquid flowing into the reactor core and in the rest of the reactor, so that the power thereof is reduced to the decay power. The core with its "inherent" heat generation is then situated in the neutron-absorbing liquid.

Operating situations with decay power cooling of the reactor core may occur both with a pressurized pressure vessel and with the vessel pressure-relieved to a pressure which only somewhat exceeds the atmospheric pressure. In certain hypothetical cases the pressure may be almost as great outside the pressure vessel as inside the same. The reason for the pressure relief may be rupture on the pressure vessel or on a pressurized tube connected to the pressure vessel. Operating situations with decay power cooling of the reactor core may also occur, inter alia, in the event of interruption in the supply of electric power or in case of disturbance in the supply of coolant to the reactor core. In the case of decay power cooling of the core, the heat can be removed passively from the core with the aid of a medium flow which may consist of a liquid or steam or a combination thereof.

The present invention makes it possible to ensure an efficient cooling of the liquid in the pressure vessel in nearly all operating situations with decay power cooling.

The favourable result obtained according to the invention can primarily be attributed to the fact that the cooling of the liquid in the pressure vessel takes place under self-circulation of a flow of liquid and/or of steam of the liquid with any contents of uncondensable gas in a circulation system containing an evaporator arranged in an evaporation pool, and to the fact that a small part of the flow is discharged from the circulation system to a discharge vessel, in which a lower pressure prevails than in the evaporator. By this discharge of a small part of the flow, a major accumulation of uncondensable gas on the primary side of the evaporator is avoided, which results in a more efficient cooling of the flow in the circulation system upon passage through the evaporator.

BRIEF DESCRIPTION OF THE DRAWINGS

The invention will be explained in greater detail by way of examples with reference to the accompanying drawings, wherein FIG. 1 schematically shows a cross section of a nuclear reactor provided with a device according to the invention, and FIG. 2 shows on an enlarged scale a part of the device according to FIG. 1.

DETAILED DESCRIPTION OF THE PREFERRED EMBODIMENT

The nuclear reactor in FIG. 1 comprises a pressure vessel 1 which is made of prestressed concrete and is provided with overpressure valves 2. A reactor core 3 included in the reactor is placed in its entirety in a reactor vessel 4. The core 3 is arranged in the lower half, usually in the lower fourth of the vessel space 5. The liquid in which the reactor vessel 4 is immersed is neutron-absorbing and in the exemplified case consists of an aqueous solution of boric acid. During normal operation the core 3 is cooled by a light water flow continuously flowing through the reactor vessel 4, the heat contents of the flow being utilized in a steam generator (not shown in FIG. 1). Water heated in the reactor departs via the conduit 6 to the steam generator and is pumped, after giving off its heat contents, via the conduit 7 back to the reactor. From the conduit 7 the water is brought via the gap 8 down to and from below through the core 3 and reaches the conduit 6 in heated condition after passage of the upper, tubular section 9 of the reactor vessel 4. During this procedure a boundary 10 is maintained between the coolant flowing through the reactor and the neutron-absorbing liquid in the upper part of the reactor, and a boundary 11 is maintained between these liquids in the lower part of the reactor. (The positions of these boundaries during normal operation are shown by dotted lines.) FIG. 1 shows the state of the reactor when a pressure equilibrium between the neutron-absorbing liquid and the reactor coolant, established during normal operation, has been disrupted and the neutron-absorbing liquid has flown into the reactor so that the power of the reactor core 3 has been reduced to the decay power. Above the liquid surface in the pressure vessel 1 a space 12 with gas and/or steam is then often provided.

The pressure vessel 1 is adapted to form part of a circulation system for self-circulation of the liquid from the pressure vessel 1 with any contents of steam of the liquid and of uncondensable gas. The self-circulation is brought about by utilizing the property of the liquid to have a higher density at a lower temperature than at a higher temperature. The circulation system comprises an evaporator 14 arranged in an evaporation pool 13, a supply conduit 15 for conducting liquid from a point of connection 15a in the upper part of the pressure vessel 1 to the evaporator 14, and a discharge conduit 16 for conducting liquid from the evaporator 14 to a point of connection 16a, located below the point of connection 15a, on the pressure vessel 1. The evaporator 14, which may consist of a tubular coil, is located at a higher level than the points of connection 15a and 16a. The evaporation pool 13 may consist of a pool with water. Heat from the evaporation pool 13 is discharged passively by free departure of steam via a conduit 17 to a heat sink 18, which, for example, may consist of the surrounding open air. If the conduit 17 is closed, the heat, as will be described later on, may be discharged via the conduit 19. In certain operating situations, when the liquid level in the pressure vessel 1 may become low and lie below the point of connection 15a, only steam with any contents of uncondensable gas escapes from the vessel 1 via the conduit 15.

In order to ensure, in all or practically all operating situations, that the heat transfer on the primary side of the evaporator 14, i.e., on that side which is part of the circulation system previously described, is good, the discharge conduit 16, at a level above the bottom 16b (FIG. 2), is connected to a discharge vessel (flash tank) 21 by a connecting conduit 20, which only allows a considerably smaller flow than the flow in the circulation system, the discharge vessel 21 being provided with one or more outlets 22a, 23a for gas and steam for maintaining a lower pressure in the discharge vessel 21 than in the evaporator 14. In an analogous manner, the supply conduit 15 may be connected, at a level above the bottom 15b (FIG. 2), to the discharge vessel 21, by means of a conduit 20a. By connecting the conduits 20 and 20a above the bottom of the conduits 15 and 16, a heat transport to the discharge vessel 21 is counteracted when the liquid flow in the discharge conduit 16 fills up a minor part of the tube area. Preferably, less than 1% of the flow is diverted through the evaporator 14 to the discharge vessel 21. As will be clear from the above description, the primary medium through the evaporator 14 may consist of different contributions of water and steam and any uncondensable gas occurring. The flow, which is passively discharged through the discharge vessel 21, prevents any major accumulation of uncondensable gas on the primary side of the evaporator 14 deteriorating the heat transfer to the evaporator 14. Passive discharge of the flow may take place by connecting the conduit 22 to a heat sink 24, which may, for example, consist of the surrounding open air, whereby the steam and the gas, before departing by themselves, are suitably brought to pass through a gas cleaning system. Alternatively, the discharge of the flow may take place through the conduit 23 to a heat sink 25 placed at a lower level than the discharge vessel 21, for example in the form of a pool of water. Via the previously mentioned tube 19, this heat sink 25 may communicate with the evaporation pool 13 in order to take up medium from this pool if the tube 17 is closed and overboiling occurs in the pool 13. Any condensed liquid which is collected in the discharge vessel 21 is discharged through the conduit 26 or through the conduit 23 if the conduit 26 is closed.

The pressure vessel 1, the evaporation vessel 13 with the evaporator 14, the conduits 15 and 16, the discharge vessel 21 and the heat sink 25 are enclosed, in the illustrated case, in a common prestressed concrete containment 27. Within the concrete containment 27 is a space 28 which is filled with a gas, preferably air or nitrogen. This space is arranged in communication with the heat sink 25 by means of a liquid seal 29. The heat sink 25 is preferably connected to a heat sink (not shown) arranged outside the concrete containment 27, for example the surrounding open atmosphere (via a gas cleaning system) and can thus be said to serve as a temporary heat sink.

Irrespective of whether the reason for the operating situation with decay power cooling of the core 3 is that a leakage has occurred in the pressure vessel 1 or in some other pressurized part within the concrete containment 27, or there is another reason, gas and steam will at least substantially be discharged from the discharge vessel 21 via the conduit 22. If the conduit 22 is closed to keep the discharged gas within the concrete containment 27, the gas and the steam will instead be discharged through the conduit 23. This will be the case even if a leakage of the kind mentioned has occurred to the space 28. The necessary pressure difference for this procedure arises because the conduits 20 and 20a in their entirety, or at least in some part, have a cross section which is small in relation to the cross section of the conduits 15 and 16 and will therefore serve as efficient throttle means for gas and steam transport.

During normal operation of the device, i.e., when the reactor produces power which is utilized in the steam generator, gas and steam are preferably discharged out through the conduit 22 while at the same time water is discharged out through the conduit 26. The conduit 23 is then closed with the aid of a water seal at the outlet of the conduit into the liquid in the pool 25. During normal operation the liquid level in the pressure vessel 1 always lies above the point of connection 15a.

I claim:

1. In a nuclear reactor system which includes a pressure vessel containing a reactor core and an aqueous neutron-absorbing liquid, the improvement wherein a circulation system is connected to said pressure vessel through which liquid and/or steam and any uncondensable gas can circulate, said circulation system including
   a cooling device which comprises an evaporator in an evaporating pool,
   a first conduit which extends from an outlet opening in an upper part of said pressure vessel to said evaporator,
   a second conduit which extends from said evaporator downwardly to an inlet opening in said pressure vessel, said inlet opening being located below said outlet opening,
   a discharge vessel that includes at least one outlet for gas and steam and for maintaining a lower pressure therein than in said evaporator, and
   a third conduit connected to said second conduit at a point above a bottom of said second conduit and extending to said discharge vessel, said third conduit enabling a small portion of fluid flow in said second conduit to pass therethrough.

2. A nuclear reactor system according to claim 1, including a fourth conduit connected to said first conduit at a point above a bottom of said first conduit and extending to said discharge vessel, said fourth conduit enabling a small portion of fluid flow in said first conduit to pass therethrough.

3. A nuclear reactor system according to claim 1, wherein said discharge vessel includes an outlet at a lower end thereof for liquid and is partially filled with liquid.

4. A nuclear reactor system according to claim 1, including a heat sink and another conduit which extends from said evaporator pool to said heat sink.

5. A nuclear reactor system according to claim 4, including a concrete containment vessel in which said pressure vessel and said evaporation pool are located, said heat sink being located outside said containment vessel.

6. A nuclear reactor system according to claim 1, including a heat sink and an additional conduit which extends from said discharge vessel to said heat sink.

7. A nuclear reactor system according to claim 6, including a concrete containment vessel in which said pressure vessel and said discharge vessel are located, said heat sink being located outside said containment vessel.

8. A nuclear reactor system according to claim 6, including a concrete containment vessel in which said pressure vessel and said discharge vessel are located, wherein said heat sink comprises a tank containing a liquid pool located in said containment vessel below said discharge vessel, said additional conduit extending through a space in said containment vessel from said discharge vessel to below a surface of said liquid pool in said tank, and sealed means providing communication between said liquid pool and said space.

9. A nuclear reactor system according to claim 1, including a concrete containment vessel in which said pressure vessel and said evaporation pool are located.

10. A nuclear reactor system according to claim 1, including a concrete containment vessel in which said pressure vessel and said discharge vessel are located.

* * * * *